April 27, 1954 — J. N. FELGER — 2,676,617
PULSATION DAMPENER
Filed Jan. 16, 1951

INVENTOR
JAMES N. FELGER
BY
Adams, Forward and McLean
ATTORNEYS

Patented Apr. 27, 1954

2,676,617

UNITED STATES PATENT OFFICE 2,676,617

PULSATION DAMPENER

James N. Felger, Kenmore, N. Y., assignor to Mathieson Chemical Corporation, a corporation of Virginia Application January 16, 1951, Serial No. 206,252

3 Claims. (Cl. 138—26)

My invention relates to apparatus for absorbing fluctuations in liquid flow systems, particularly reaction or transfer systems for handling liquid reaction streams containing absorbed gas or vapor under pressure, in stream flow without back mixing in the stream.

My invention has special value in reaction systems for the manufacture of hydrazine by a two-stage reaction involving first reaction of aqueous ammonia and aqueous hypochlorite solution at low temperature followed by high temperature-high pressure reaction of chloramine so produced with excess ammonia in a tubular reactor providing stream flow of the reactants. The reaction stream customarily is discharged into a distillation tower where excess ammonia is flashed off. The efficient operation of the distillation tower requires a steady flow rate of the reaction stream while obviously transfer and high pressure pumps may move the liquid reaction stream in surges and irregular heating or evolution of gas may contribute to fluctuating rates of flow. The conventional apparatus for overcoming this difficulty by smoothing out liquid flow rates and maintaining constant pressure in the system is a surge tank in which a relatively static body or reservoir of liquid is maintained as a buffer in the transfer system. Entry of liquid into the surge tank and transfer out of the tank, however, necessarily results in top-to-bottom mixing which is intolerable in a system such as the high temperature-high pressure hydrazine reaction system requiring progressive flow of reactants for good yield.

My invention provides a surge tank which maintains line or stream flow in a liquid flow system while simultaneously providing means for flexibly and adequately absorbing fluctuations in flow and smoothing out pressure variations. The new line-flow surge tank employs a vertical column or cylindrical vessel containing a plurality of small diameter tubes or open-ended elongated conduits of restricted cross section extending from the bottom section of the column to a point in the upper section of the column below the top. The liquid stream enters the column through an inlet pipe to the bottom section and leaves the column through a side take-off pipe at the upper level of the internal tubes so that parallel flow is provided through the column upwardly along its vertical axis. A vapor expansion dome is situated over the top of the column and around a portion of the upper section so that an enlarged vapor space is provided above the column and an annular overflow space is provided around the enclosed upper section of the column. Advantageously, a perforated plate covers the top of the column within the dome to promote foam breaking when liquid surges are accompanied by foam. Also drain holes in the upper section of the column at the base of the annular section are provided with advantage so that over-flow is automatically returned to the system.

The construction and operation of the new line surge tank will be more readily followed by reference to the accompanying drawing in which.

Figure 1:
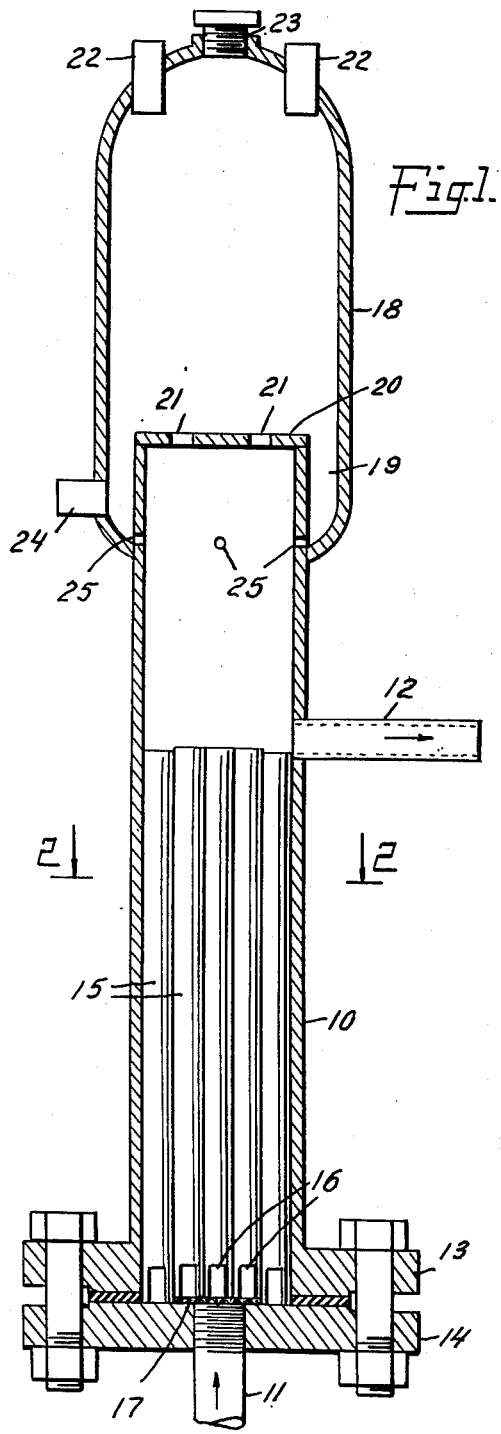
Figure 1 represents a vertical section through the apparatus.
Figure 2:
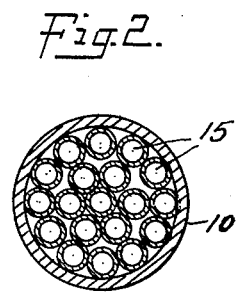
Figure 2 represents a cross section along the line 2—2.

Cylindrical column or vessel 10 is equipped in the bottom with an inlet pipe 11 and upper side take-off pipe 12. The column 10 is constructed with a flange 13 to which is bolted bottom cover plate 14. The column 10 as shown is tightly packed with a plurality of open-ended tubes 15. The top of the tubes 15 are flush with the bottom of side take-off pipe 12. The tube ends 16 are cut out or notched through to provide ready access by the entering liquid stream to each tube and free communication from one tube end to another in order to provide uniform flow. The tube or tubes standing above bottom inlet pipe 11 are supported by a coarse screen or grid 17. Above the top of the column 10 is situated expansion dome 18 disposed in a way such as to surround a portion of the upper section of the column 10 and provide annular overflow space 19. The top of the column 10 advantageously is covered with a plate 20 perforated with one or more openings 21. Approximately flush with the bottom of annular space 19 are one or more drain holes 25.

Pressure taps 22 are provided at the top of the dome 18 for instrumentation such as for measurement and recording of pressure. For convenience in maintenance, a clean-out hole with plug 23 is provided. Also indicated in the section is a drain hole 24 which is plugged during operation but which is provided for the purpose of cleaning out the tank when it is not in use by attachment of a drain line.

In the operation of the new line surge tank, the liquid stream from the reaction or transfer system is pumped into the internal tubes 15 of column 10 through inlet pipe 11. The stream is distributed in the bottom section of column 10 and by reason of notched openings in the tube ends 16 flows into internal tubes 15 and upwardly in parallel stream flow to side take-off pipe 12. The rate of withdrawal through side take-off valve 12 ordinarily will be controlled by a flow rate controller or a pressure reduction valve (not shown), and the liquid level fluctuates between the side take-off pipe and the foam plate. If a foaming condition occurs, the foaming rises up through column 10 above the take-off pipe 12 and overflows through foam plate 20 into expansion dome 18. The foam breaks in annular space 19 and drains back to column 10 through drain holes 25. Where foaming is unlikely to occur, drain holes 25 are unnecessary and any liquid collecting in annular space 19 may be drained off externally.

I have found that, applied in hydrazine manufacture, the new line surge tank substantially completely avoids yield losses due to back mixing or top-to-bottom mixing of reactants resulting from holding or transferring the hydrazine synthesis stream in or through vessels or pipes of large diameter. The significance of diameter to flow length is described in detail in application Serial No. 218,212 filed March 29, 1951, of Bernard H. Nicolaisen, in which it is shown that a tubular reactor of about 18 to 1 ratio of length to diameter is necessary for optimum yield due to the tendency of the hydrazine product to decompose by reaction with chloramine present to form nitrogen and ammonium chloride in areas of back mixing. By way of further example, I found in experimental runs that the use of tubular sections of 8 inches by 24 inches resulted in yields of only 2 to 3 per cent hydrazine, whereas the use of tubular sections of 2 inches by 36 inches under the same conditions resulted in yields of 50 to 60 per cent hydrazine.

An example of the tubular surge tank illustrated in the drawing which I have found highly satisfactory in hydrazine synthesis from the standpoint of yield, pressure control and flow rate control, had an overall height of about 3 feet. The column itself had an overall height of about 2 feet with about 15 inches from the point of bottom inlet to the axis of the side take-off pipe. The diameter of the column was 4 inches and the construction was 347 type stainless steel. The tubes were of 18 to 20 gauge, type 347 stainless steel construction and were of three-quarter inch by 14 inches in dimensions. The tubes were stacked tightly together within the column between the point of bottom entry and the side take-off pipe. A tube bundle or multiple channel core can be used but I have found that loose tubes are convenient and inexpensive. A more elaborate distributing system than the notched tube ends can be used if desired for the bottom section. The expansion dome was constructed of a 6-inch by about 10-inch pipe swedged at the bottom to shape and fitted with a 6-inch by about 3½-inch cap welded in place.

I claim:

1. A line-flow surge tank which comprises a vertically disposed column with an inlet pipe to its bottom section and a side take-off pipe from an upper section, a plurality of open-ended elongated conduits of restricted cross section disposed within the column providing parallel flow upward along its vertical axis from the bottom section to the side take-off, a vapor expansion dome of enlarged cross sectional area in relation to that of the column disposed over the top of the column surrounding a portion of its upper section so as to provide an annular overflow space in the lower section of the dome, and drain means providing drainage from the base of the annular space to the column.

2. A line-flow surge tank which comprises a vertically disposed column with an inlet pipe to its bottom section and a side take-off pipe from an upper section, a plurality of open-ended elongated conduits of restricted cross section disposed within the column providing parallel flow upward along its vertical axis from the bottom section to the side take-off, a vapor expansion dome of enlarged cross sectional area in relation to that of the column disposed over the top of the column surrounding a portion of its upper section so as to provide an annular overflow space in the lower section of the dome, a perforated foam plate at the top of the column within the dome, and drain means providing drainage from the base of the annular space to the column.

3. A line-flow surge tank which comprises a vertically disposed column with an inlet pipe to its bottom section and a side take-off pipe from an upper section, a plurality of tubes of restricted cross section providing parallel flow channels from the bottom section to the side take-off with communicating openings at the foot of each tube, a vapor expansion dome of enlarged cross sectional area in relation to that of the column disposed over the top of the column surrounding a portion of its upper section so as to provide an annular overflow space in the lower section of the dome, a perforated foam plate at the top of the column within the dome, and drain holes in the upper section of the column providing drainage from the base of the annular space to the column.

References Cited in the file of this patent

UNITED STATES PATENTS

| Number | Name | Date |
| --- | --- | --- |
| 2,051,019 | Arutunoff | Aug. 18, 1936 |
| 2,497,491 | Douglas | Feb. 14, 1950 |
| 2,530,190 | Carver | Nov. 14, 1950 |
| 2,532,756 | Brunjes et al. | Dec. 5, 1950 |